(12) United States Patent
Gery

(10) Patent No.: US 6,841,910 B2
(45) Date of Patent: Jan. 11, 2005

(54) MAGNETIC COUPLING USING HALBACH TYPE MAGNET ARRAY

(75) Inventor: Jean-Marc Gery, West Hollywood, CA (US)

(73) Assignee: Quadrant Technology Corp., Sunnyvale, CA (US)

( * ) Notice: Subject to any disclaimer, the term of this patent is extended or adjusted under 35 U.S.C. 154(b) by 63 days.

(21) Appl. No.: 10/263,081

(22) Filed: Oct. 2, 2002

(65) Prior Publication Data

US 2004/0066107 A1 Apr. 8, 2004

(51) Int. Cl.$^7$ .............................. H02K 7/00; H02K 1/06; H02K 1/22
(52) U.S. Cl. ...................... 310/103; 310/75 R; 310/114; 310/156.43; 310/156.28
(58) Field of Search ................................. 310/103, 105, 310/114, 115, 75 R, 75 D, 92, 156.43, 154.28

(56) References Cited

U.S. PATENT DOCUMENTS

| | | | | |
|---|---|---|---|---|
| 3,936,683 A | * | 2/1976 | Walker ........................ | 310/103 |
| 4,115,040 A | * | 9/1978 | Knorr .......................... | 417/420 |
| 4,896,754 A | | 1/1990 | Carlson et al. | |
| 5,280,209 A | * | 1/1994 | Leupold et al. ......... | 310/156.41 |
| 5,349,258 A | * | 9/1994 | Leupold et al. ......... | 310/154.43 |
| 5,376,862 A | * | 12/1994 | Stevens .................... | 310/75 D |
| 5,631,618 A | | 5/1997 | Trumper et al. | |
| 5,633,555 A | * | 5/1997 | Ackermann et al. ...... | 310/75 D |
| 5,705,902 A | | 1/1998 | Merritt et al. | |
| 5,994,809 A | * | 11/1999 | Ackermann ................. | 310/103 |
| 6,054,788 A | * | 4/2000 | Dombrovski et al. ....... | 310/103 |
| 6,104,108 A | | 8/2000 | Hazelton et al. | |
| 6,111,332 A | | 8/2000 | Post | |
| 6,169,352 B1 | | 1/2001 | Hull | |
| 6,188,147 B1 | | 2/2001 | Hazelton et al. | |
| 6,208,045 B1 | | 3/2001 | Hazelton et al. | |

OTHER PUBLICATIONS

"The Application of Halbach Cylinders to Brushless AC Servo Motor", Atallah et al, IEEE vol. 34, No. 4, Jul. 1998.*
"A Novel Self–Shielding Permanent Magnet Rotor Assembly", Potenziani et al, J. Appl. Phys. vol. 64, No. 10, Nov. 15, 1988.*
"Halbach Permanent Magnet Machines and Applications: A Review", Zhu et al, IEEE vol. 148, No. 4, Jul. 2001.*

* cited by examiner

Primary Examiner—Tran Nguyen
(74) Attorney, Agent, or Firm—Robert S. Kelly

(57) ABSTRACT

A magnetic coupling having two opposed annular arrays of angularly spaced permanent magnets magnetized to create magnetic north poles and magnetic south poles alternately spaced about each array. The north-pole and south-pole magnets of each array are tapered in cross-section from their surfaces at the gap to an annular surface of the array spaced from the gap, and permanent magnet spacer magnets completely fill in the space between the north-pole and south-pole magnets from the annular surface of the array at the gap to the spaced annular surface with the spacer magnets being magnetized generally transversely to the direction of magnetization of the adjacent north-pole, south-pole magnets so that the magnetic field created by the permanent magnets extends across the gap and annularly through each array to cause one of the arrays to rotate in synchronism with the other array.

14 Claims, 3 Drawing Sheets

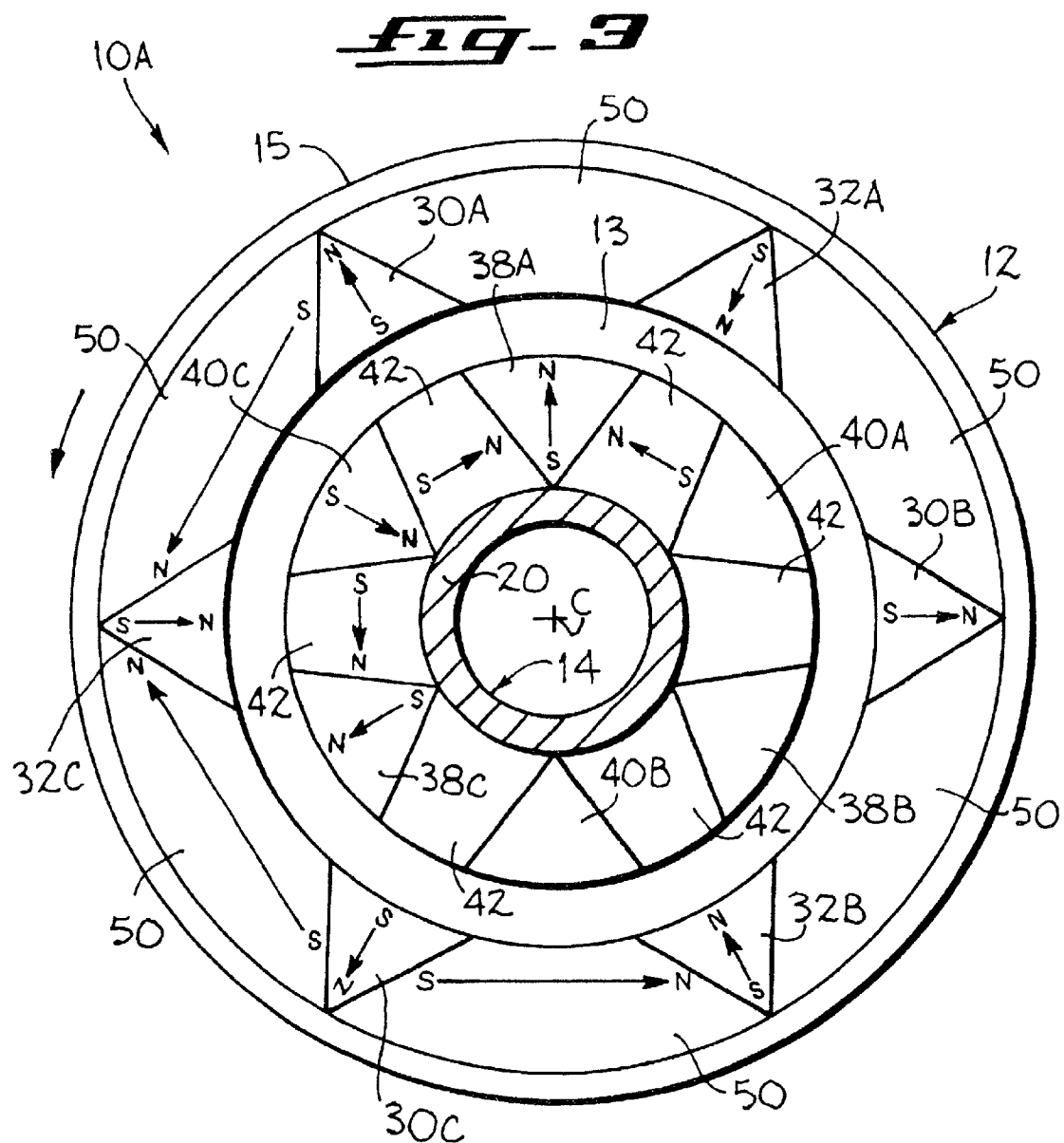

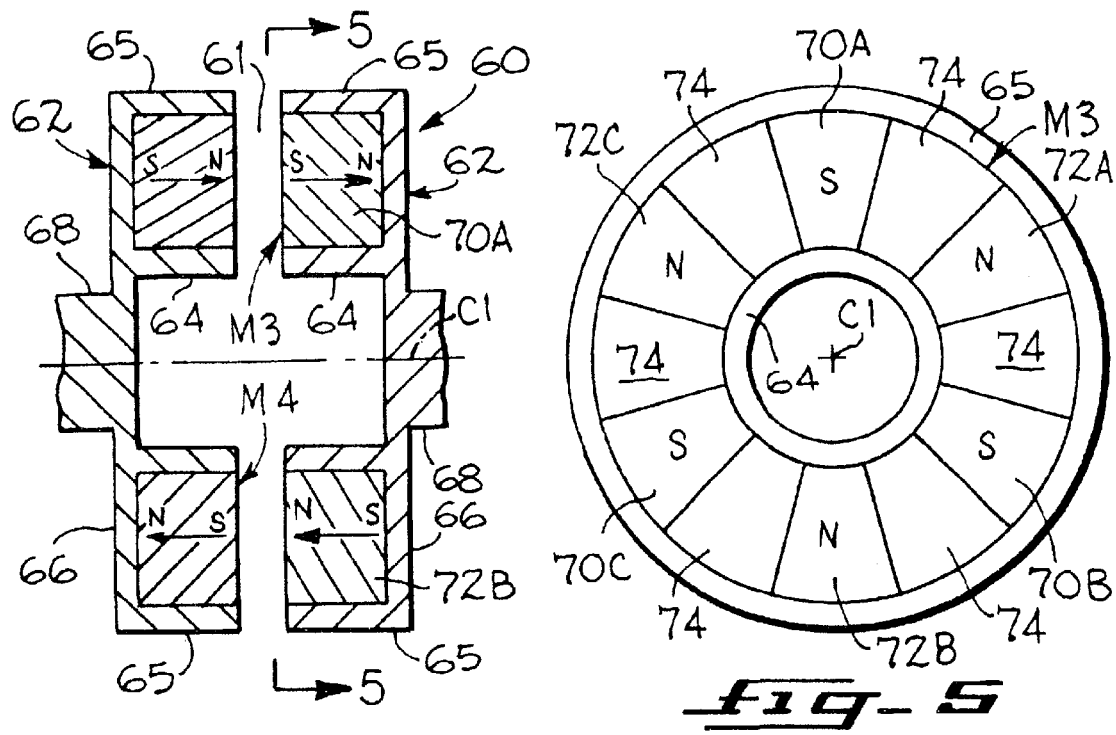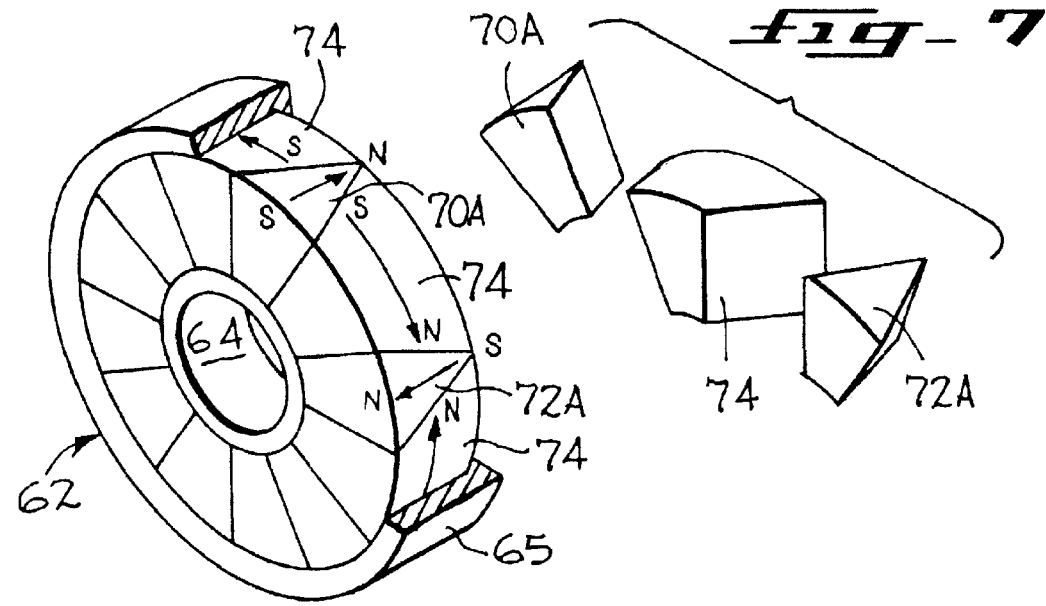

MAGNETIC COUPLING USING HALBACH TYPE MAGNET ARRAY

BACKGROUND OF THE INVENTION

The present invention pertains to magnetic couplings, and more particularly, it pertains to magnetic couplings comprised of annular arrays of angularly spaced permanent magnets sequentially polarized in opposite directions.

Magnetic couplings are devices utilizing magnetic fields to transmit torque between a driving member and a driven member without any physical contact between the members. Thus, they have been widely used on seal-less pumps, for example, wherein volatile, flammable, corrosive, abrasive, or foul-smelling liquids are being pumped and it is difficult or undesirable to use conventional seals to seal the drive mechanism from the driving impeller within the liquid. Magnetic couplings have also found wide use in pumps or rotary positioning devices that are designed to operate in a vacuum wherein the provision of seals about a mechanical force-transmitting coupling would obviously create problems.

Magnetic couplings typically include two annular assemblies or arrays of permanent magnets having south-pole and north-pole faces being spaced angularly about each of the arrays. The arrays can be arranged in a face-to-face relationship in an axial direction, i.e., with the arrays having a common axis of rotation and with the individual pole faces of the opposed arrays facing each other in a direction parallel to the axis of rotation, or, they can be arranged concentrically with the individual pole faces of the opposed arrays facing each other in a radial direction to the common axis of rotation of the arrays. One of such arrays is adapted to be connected to a motor or other driving means while the other array is adapted to be connected to a pump impeller or other member to be driven. When the arrays are at rest, i.e., when there is no load upon the coupling, the opposed north and south pole faces of the opposed arrays align with each other due to the attractive force therebetween and the repulsive forces of the adjacent pole faces. When the rotary drive force is applied to the one array, the other array is caused to rotate in synchronism therewith due to the attractive and repulsive forces mentioned. As a load is applied to the driven member, the arrays will continue to rotate synchronously although the pole faces on the driven array will trail the pole faces on the drive array by a small rotary angle. When an excessive load is applied exceeding the maximum torque that can be generated by the coupling, the arrays de-couple and the drive array will rotate by itself. Under such a condition, the drive must be stopped and restarted before the arrays can again be coupled and rotated in synchronism.

In conventional prior art magnetic couplings the adjacent north-pole and south-pole magnets of each permanent magnet array are spaced apart by air gaps or by non-magnetically conductive material, and the transfer of magnetic flux between the adjacent magnets within each array is provided by a separate magnetically conductive member physically connecting each of the north-pole and south-pole magnets at a location spaced from the gap. Examples of such prior art magnetic couplings, for example, are shown in U.S. Pat. No. 4,896,754 to Carlson et al.

In recent years various designs of motors and generators have been suggested and built utilizing a Halbach array of permanent magnets wherein the array is comprised of separately magnetized segments with spaced north-pole and south-pole segments and separately magnetized segments interposed between the north-pole and south-pole segments and magnetized in a direction transversely of the adjacent north-pole and south-pole segments. Examples of such motors and generators are shown in U.S. Pat. Nos. 5,631,618 to Trumper et al; 5,705,902 to Mettitt et al; 6,104,108 to Hazelton et al; 6,111,332 to Post; 6,169,352 to Hull; 6,188,147 to Hazelton et al; and 6,208,045 to Hazelton et al.

SUMMARY OF THE INVENTION

The present invention uses a conventional magnetic coupling arrangement such that north-pole and south-pole producing permanent magnets are angularly and alternately spaced about each of a pair of opposed annular arrays so as to generate a strong magnetic field adjacent to the pole faces of the magnets in the annular gap between the arrays to effect a coupling force across such gap. However, in contrast to the prior art structures for such coupling arrangements, a Halbach type of magnet array is provided whereby the adjacent north-pole and south-pole magnets in each array are connected by one or more spacer permanent magnets which are magnetized so as to provide a magnetic flux path annularly within the array between the north-pole, south-pole magnets rather than through a separate, magnetically conductive member externally of the magnet array. The north-pole, south-pole and spacer magnet arrangement should form a perfect annulus so that a uniform inner annular surface is provided at the annular space, or gap, adjacent to the north-pole, south-pole magnet faces and a uniform outer annular surface is provided at an annular location spaced from the gap. This innovation has resulted in less leakage in the magnetic arrays and a significant increase in the magnetic field strength at the gap for a given volume of magnetic array.

In the preferred arrangement, and in order to maximize the efficient transfer of magnetic flux within the magnetic array and minimize the flux leakage, the north-pole and south-pole magnets are tapered in the radial direction away from the gap so that a relatively large surface area of such magnets is presented at the gap and a relatively small surface area is presented at the outer annular surface of the array. Ideally, the annular surface of the north-pole and south-pole magnets at the outer annular surface of each array can be reduced to a minimum or knife-edge so that the north-pole and south-pole magnets are pie-shaped in general contour.

BRIEF DESCRIPTION OF THE DRAWINGS

FIG. 3 is an enlarged section similar to that of FIG. 2 but illustrating a second embodiment of the magnetic coupling of the present invention.

FIG. 4 is a central section through a third embodiment of the magnetic coupling of the present invention.

FIG. 5 is a section taken along line 5—5 of FIG. 4.

FIG. 6 is a perspective view of one of the magnetic array members of the coupling shown in FIG. 4 with a portion thereof being broken away in order to more clearly indicate the manner of magnetization of the individual magnet segments.

FIG. 7 is an exploded perspective view of the three different types of magnet segments forming the magnet array of FIG. 6.

DESCRIPTION OF THE PREFERRED EMBODIMENTS

Figure 1:
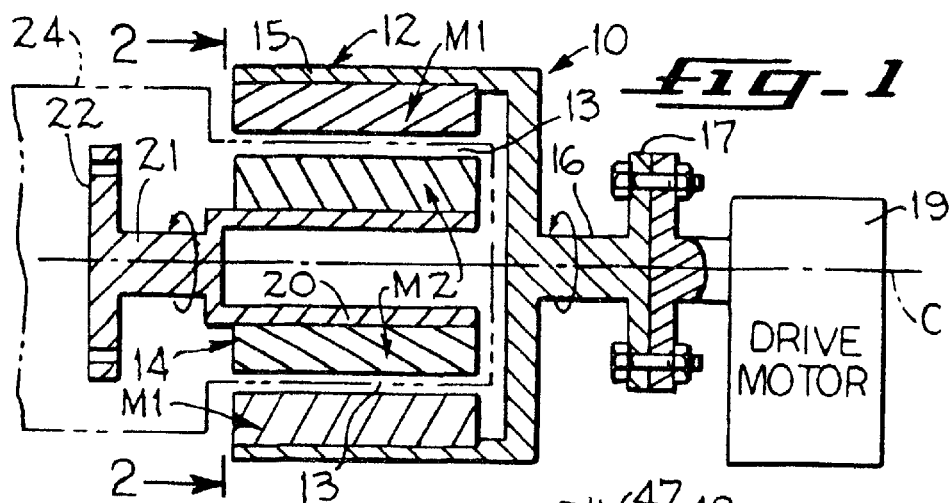
FIG. 1 is a diagrammatic central section through a first embodiment of the magnetic coupling of the present invention illustrating its use in a typical magnetic drive arrangement.

FIG. 1 illustrates in somewhat diagrammatic form one embodiment 10 of the magnetic coupling device of the present invention wherein a pair of opposed permanent magnet annular arrays 12, 14 are set in a concentric arrangement so as to provide an annular air gap 13 therebetween. The outer array 12 will be seen to include an inner permanent magnet annulus M1 comprised of a plurality of separately magnetized segments and an outer hub 15 having a thin annular wall of non-magnetic conductive material for securing the magnet annulus in place. The inner array 14 will be seen to include an outer permanent magnet annulus M2 comprised of a plurality of separately magnetized segments and an inner hub 20 having a thin annular wall of non-magnetic conductive material for securing the magnet annulus M2 in place.

While either the outer ring 12 or the inner ring 14 could equally well be used as the driving ring of the coupling (dependent only upon the particular end use to which the coupling is to be put and the particular structure of the associated apparatus), in the arrangement illustrated in FIG. 1 the outer ring 12 is used as the driving member of the coupling, and the inner ring 14 is used as the driven member of the coupling. Thus, the hub 15 of ring 12 is provided with an axially extending shaft 16 to which a flange 17 is attached, and the flange 17 can be bolted or otherwise securely attached to a drive motor 19 as shown. The hub 20 of the inner, or driven, ring 14 is also provided with an axially extending shaft 21 to which an attachment flange 22 is provided at its distal end. Obviously, the flange 22 can be attached to any member that is to be driven, typically, the impeller (not shown) of a pump or the like. In a conventional arrangement, the driven apparatus (e.g., a pump) includes a housing or shroud that seals the entire apparatus from physical contact with the driving element. In the diagrammatic illustration of FIG. 1, a wall of this shroud is illustrated by the phantom line 24, and it will be seen that the wall passes centrally through the air gap 13 and is at least slightly spaced from the surfaces of both of the rotatable rings 12, 14 with the inner ring 14 being located entirely within the shroud so that it can be securely attached to the member to be driven. The requisite thickness of the wall 24 thus determines the requisite minimum dimension of the gap 13 which, in turn, determines the required magnetic field strength across the gap for a given required coupling torque.

An important feature of the present invention is the use of a Halbach type magnet array in each of the opposed rings 12, 14 so that the magnetic field generated by the opposed permanent magnets thereof will be carried entirely within the magnets themselves and the annular gap therebetween; thus, a special conductive member on the outer annular face of each array is not required as in those prior art devices wherein the permanent magnets are angularly spaced by air gaps about the array. Furthermore, as will be made clear hereinafter, the inclusion of a complete permanent magnet cross-section throughout the total potential volume of each magnet array of given dimensions means that a substantially increased magnetic field strength can be obtained for a given volume of array over those prior art magnet arrays with air gaps or non-magnetic material within the array.

Figure 2:
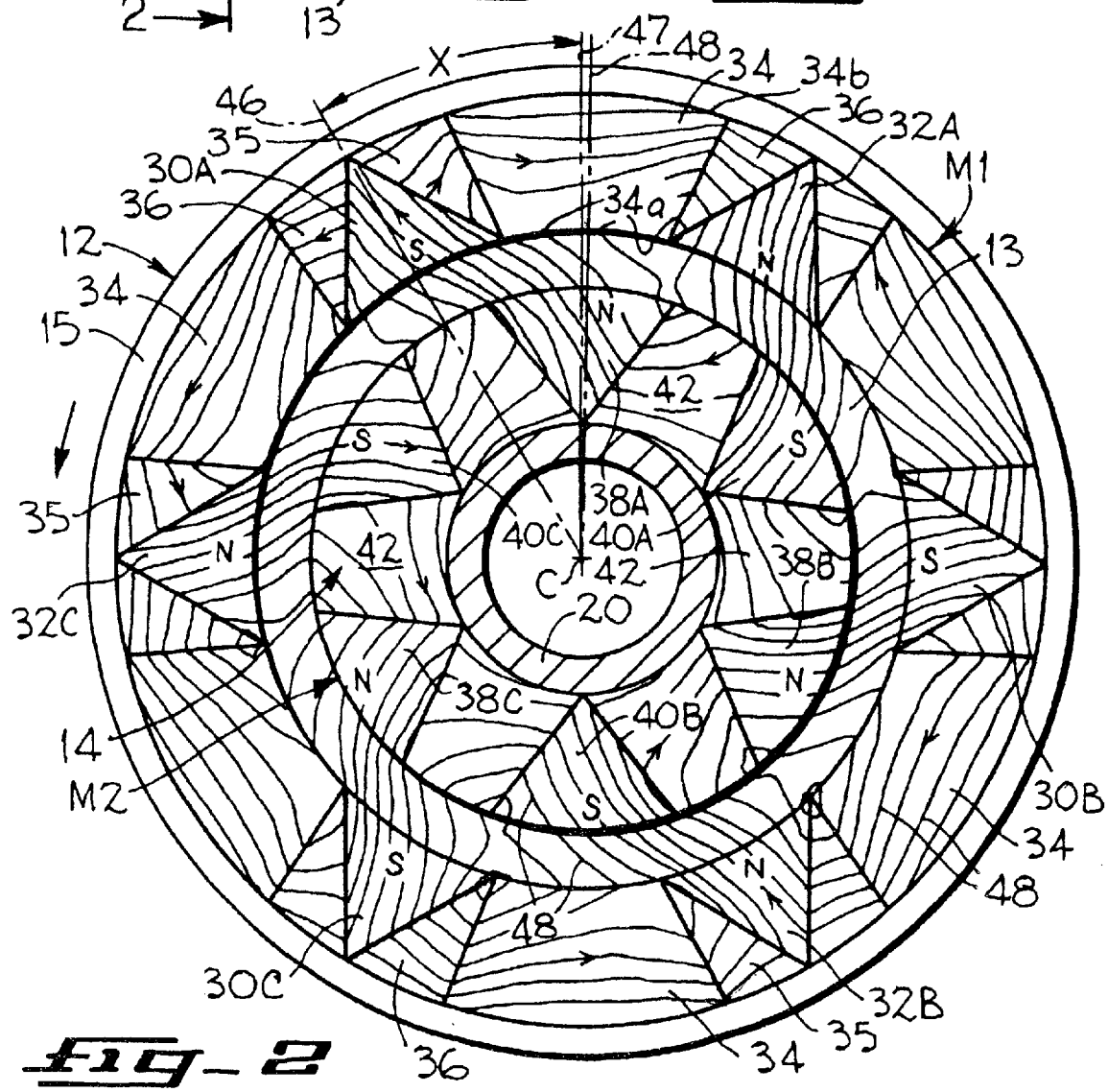
FIG. 2 is an enlarged section taken along line 2—2 of FIG. 1 and further illustrating the magnetic field pattern and magnetic flux lines created when the outer magnet array is used to drive the inner magnet array at a maximum torque condition.

The arrangement of the individual magnets or magnetic segments in each of the permanent magnet annuluses M1 and M2 is best seen in FIG. 2. In the arrangement shown therein, it will be noted that the outer magnet M1 array includes three south-pole magnetic segments 30A, 30B and 30C of generally triangular cross-section (in the axial direction) spaced 120 degrees apart about the array and three north-pole magnetic segments 32A, 32B and 32C of generally triangular cross-section also spaced 120 degrees apart about the array with the north-pole segments being angularly spaced from and located midway between the south-pole segments. Filling in the angular gaps between each of the adjacent north-pole and south-pole segments are three magnetic spacer segments 34, 35 and 36 having axial cross-sections such that a completely solid ring M1 of magnetic material is provided having a uniformly cylindrical inner surface at the gap 13 and a uniformly cylindrical outer surface at the inner surface of the supporting hub 15. The inner magnet array M2 includes three north-pole magnetic segments 38A, 38B and 38C identical in shape to the segments 30 and 32 angularly spaced 120 degrees apart about the array and three south-pole magnetic segments 40A, 40B and 40C also identical in shape to the previously mentioned north-pole and south-pole segments and spaced 120 degrees apart about the array with the segments 40A, 40B and 40C being angularly spaced from and located midway between the segments 38A, 38B and 38C. Six spacer magnetic segments 42 are provided to fill in the angular gaps between the north-pole and south-pole segments 38, 40 so as to provide a completely solid inner ring M2 having a uniform outer cylindrical surface at the gap 13 and a uniform inner cylindrical surface at the outer support surface of the hub 20. In their drive arrangement the magnet arrays M1 and M2 are thus positioned concentrically about a central axis of rotation C (FIGS. 1 and 2) with the cylindrical air gap 13 located therebetween.

In common with the prior art magnetic coupling arrangements the magnetic north-pole and magnetic south-pole magnets of the coupling are alternately spaced about the gap-facing surfaces of each of the arrays M1, M2 so that when one of the arrays is driven the attractive force of the magnetic field at the opposed north and south pole magnetic pairs (six being shown in the described embodiment) will cause the other array to rotate in synchronism therewith. As mentioned previously it is one of the features of the present invention to use a Halbach type magnet array wherein the magnetic flux is maintained entirely within the magnetic rings and the gap, and, in order to facilitate this, it will be noted that each of the south-pole segments 30A, B and C and 40A, B and C and each of the north-pole segments 32A, B and C and 38A, B and C is tapered from a maximum annular surface area at the gap 13 to a minimum annular surface area at the opposite radial end (FIG. 2) thereof. For example, as can clearly be seen in FIG. 2, south-pole segment 30A and north-pole segment 30B each tapers from its maximum exposed surface at the gap to a narrow knife-edge surface at the inner surface of the support hub 15. Similarly, on the inner array M2, north-pole segment 38A and south-pole segment 40A, for example, each taper from a maximum exposed surface at the gap to a minimum, knife-edge surface at the wall of the inner hub 20. Each of the north-pole segments 32 and 38 of both arrays is magnetized in a radial direction, i.e., in a direction transverse of the gap 13, so as to create a magnetic north pole at the gap surface and a magnetic south pole at the opposed knife-edge surface thereof. Similarly, each of the south-pole segments 30 and 40 of both arrays is magnetized in a radial direction so as to create a magnetic south pole at the gap surface and a magnetic north pole at the opposed knife-edge surface thereof.

Positioned between each adjacent pair of north-pole and south-pole magnetic segments in the outer array M1 are three separately magnetized spacer segments 34, 35 and 36 of magnetic material each magnetized in a direction generally transversely of the radial directions of magnetization of the adjacent north-pole and south-pole segments. As can be seen at the top of FIG. 2, the central spacer segment 34 located in this position has an inner annual face 34a in abutment with the edges of the adjacent south-pole segment 30A and the adjacent north-pole segment 32A and extends outwardly to the retaining wall of the hub 15 to an outer annular surface 34b spaced from but in annular alignment with the outer knife-edge surfaces of the adjacent segments 30A and 32A. Wedge-shaped spacer segments 35 and 36 fill in the gaps between the segments 30A and 32A and the intermediate spacer segment 34 so that one solid ring of magnetic material is provided by the magnet array M1 having uniform outer and inner annular surfaces. The spacer segment 34 is magnetized transversely to the radial direction, i.e., in a direction perpendicular to the radial line 48 (FIG. 2) which bisects the segment 34, and each of the spacer segments 35 and 36 are magnetized in a direction generally transverse to a line bisecting the segment from the knife-edge surface at the gap 13 to the annular surface thereof at the outer annular wall of the array. The directions of magnification in each of the spacer segments 34, 35 and 36 arranged about the array M1 is thus such that magnetic flux will be conducted from the south-pole segments 30A, 30B and 30C to the adjacent north-pole segments 32A, 32B and 32C in a multi-angled path approximating the curvature of the array. Each of the separately magnetized segments 30, 32, 34, 35 and 36 forming the complete array M1 is glued or otherwise bonded by a thin layer of epoxy or the like along those surfaces in abutting engagement with the adjacent segments in order to maintain the array together in one piece, and the outer annular surface of the array may also be glued or otherwise secured to the enclosing support hub 15 to maintain it in the appropriate position in the coupling.

In the inner magnet array M2 the conduction of magnetic flux in the transverse direction between each of the south-pole segments 38A, 38B and 38C and the adjacent north-pole segments 40A, 40B and 40C is provided by separately magnetized spacer segments 42 which are of a generally trapezoidal shape in axial cross-section (FIG. 2) and dimensioned so as to entirely fill in the gaps between the north-pole and south-pole segments from the inner to the outer annular faces of the array. As with the M1 array, the individually magnetized segments 38, 40 and 42 thereof are bonded together by a thin epoxy layer, for example, and the array may be secured about the supporting hub 20 by a similar epoxy or other bonding means to maintain it in the appropriate position in the coupling.

In order to better illustrate the magnetic coupling across the gap 13 and through the magnetized segments of the permanent magnet arrays M1 and M2, it will be noted that FIG. 2 has been provided with magnetic flux lines 148 having various directional arrows thereon to denote the direction of flux travel across the gap 13 and within the magnet arrays M1 and M2. In the dynamic illustration of FIG. 2 the outer array M1 is the driving array and it is rotated counterclockwise as indicated by the arrow at the left of the Figure. The inner array M2 is, of course, also rotated counterclockwise in synchronism with array M1 under the attraction of the opposed north and south pole faces across the gap 13. It will be noted, however, that the north and south pole faces of the outer array M1 are not in exact radial alignment with the opposed north and south pole faces on the inner array M2 with each inner array pole face trailing its opposite pole face on the outer array by a slip angle X in the FIG. 2 illustration. Thus, it will be noted that the south-pole segment 30A on the outer drive array M1 angularly leads its opposed north-pole segment 38A on the driven array M2 by the slip angle X which is shown as the angle between the radial lines 46 and 47 bisecting the segments 30A and 38A respectively. The dynamic condition of the coupling illustrated in FIG. 2 is, in particular, that one wherein the maximum amount of torque is developed by the coupling, i.e., the dynamic condition wherein the maximum load which the coupling is capable of handling is applied to the driven array M2. During no-load conditions or when the arrays are stationary it will be recognized that the opposed south-pole segment 30A and north-pole segment 38A (as well as the other opposed segments of the arrays) will be in exact radial alignment, i.e., slip angle X will be zero. As the magnet arrays rotate in synchronism and the load is gradually increased on the driven array M2, the slip angle will likewise gradually increase up to the maximum angle X as illustrated in FIG. 2. As mentioned, the three-piece transversely magnetized spacer segments 34, 35 and 36 in array M1 result in a three direction shift in the magnetic flux orientation between the adjacent north-pole and south-pole segments to closely approximate the annular curvature of the outer array M1 in order to improve the effectiveness of the magnetic flux transfer within the array. It will also be noted that the spacer segments 42 on the inner array M2 perform the same function as the combined spacer segments 34, 35 and 36 in the outer array M1 in conducting the magnetic flux between the adjacent north-pole and south-pole segments. Since the north-pole and south-pole segments of both arrays are identical for maximum flux transfer between the arrays, the angular distance between such segments on the inner array M2 is necessarily smaller than that on the outer array M1, and therefore, the single spacer segments 42 of the inner array are quite suitable to transversely conduct the magnetic flux within the inner array.

While in the embodiment of the invention illustrated in FIGS. 1 and 2 there are six opposed north-pole, south-pole magnet pairs for coupling the arrays M1, M2 across the gap 13, it will be appreciated that any number of such magnet pairs (lesser or greater) might be used about the arrays M1 and M2 depending upon the overall sizes of the coupling and the gap, the amount of maximum torque to be generated, and the particular use for which the coupling is designed.

A slightly modified version 10A of the magnetic coupling of the present invention is provided by the second embodiment thereof shown in FIG. 3. Coupling 10A is identical to coupling 10 of FIGS. 1 and 2 in all respects (and the same elements of each are given the same identifying numerals or letters) with the single exception that each set of spacer segments 34, 35 and 36 of the outer array M1 (FIG. 2) is replaced by a single spacer segment 50 (FIG. 3). The N (north) and S (south) arrows on FIG. 3 indicate the directions of magnetization of each of the magnetic segments 30, 32, 38, 40, 42 and 50 making up the inner and outer magnet arrays. Thus, the spacer segments 50 are each magnetized in a direction transverse to the radial centerline of the segment (similarly to the magnetization of spacer segments 34)) to angularly transfer the magnetic flux between the adjacent south-pole, north-pole segments 30, 32. While it is believed that the FIG. 2 arrangement will result in a slightly more efficient magnetic flux transfer within the outer magnet array, the FIG. 3 arrangement will reduce construction and assembly costs and will quite clearly operate within the parameters of the present invention.

FIGS. 4–7 illustrate a third embodiment 60 (FIG. 4) of the magnetic coupling of the present invention wherein annular permanent magnet arrays M3 and M4 couple across an annular gap 61 that is located in the axial direction relative to the arrays, i.e., with the direction of the gap from pole-to-pole between the arrays being parallel to the axis of rotation C1 (FIGS. 4 and 5) of the coupling rather than extending in a radial direction with respect to the axis of rotation as in the FIG. 1 and FIG. 3 embodiments. Each array M3, M4 is secured within a hub 62 that includes an annular outer wall 65, an annular inner wall 64, and a flat connecting wall 66 to secure the segments of the arrays in place therebetween. As with the prior described embodiments of the invention the support hubs 62 must be made of a magnetically non-conductive material (such as aluminum) so as not to short out the magnetic flux paths through the arrays. Each hub is also provided with an axially extending shaft 68 (FIG. 1), one shaft being provided with any suitable conventional means for attachment to a drive motor (not shown) and the other shaft being provided with any suitable conventional means for attachment to a member to be driven (not shown). As with the aforedescribed embodiments, the driven array may be located entirely within an enclosed housing with a cover or shroud member (not shown) being positioned centrally of the air gap 61 and spaced from each of the rotating arrays M3 and M4.

It will be understood that the opposed arrays M3 and M4 are identical and that each include (FIG. 5) three south-pole magnetic segments 70A, 70B and 70C spaced 120 degrees apart about the array and three north-pole magnetic segments 72A, 72B and 72C also spaced 120 degrees apart about the array and being located between and angularly spaced from the south-pole segments. Filling each of the gaps between each adjacent pair of north-pole and south-pole segments are transversely magnetized spacer segments 74 that extend to fill all of the space between the north-pole and south-pole segments and between the outer wall 65 and the inner wall 64 of the hub 62 so that a uniform annular magnet array is provided (FIG. 6) having continuous annular outer and inner faces. Also, as in the aforedescribed embodiments of the invention and as best seen in the perspective view of FIG. 6 and the exploded view of FIG. 7, each of the north-pole and south-pole segments 72, 70 is tapered in cross-section away from the air gap 61 from a maximum surface area at the gap to a minimum surface area, or knife-edge surface, at the outer flat retaining wall 66 of the support hub 62. Thus, the transversely magnetized spacer segments 74 are provided with their maximum cross-section (FIGS. 6 and 7) at the outer annular faces thereof so as to most efficiently conduct the magnetic flux through the array and minimize the leakage flux.

The direction of magnification of each of the separately magnetized spacer segments 70, 72 and 74 of each array M1, M2 is shown in FIGS. 4 and 6. Thus, each south-pole segment (e.g., 70A in FIGS. 4 and 6) is magnetized to create a magnetic south pole at the gap 61, and each north-pole segment (e.g., 72B in FIG. 4 or 72A in FIG. 6) is magnetized to create a magnetic north pole at the gap 61. The spacer segments 74 are magnetized perpendicularly to the radially extending axis of the segment (as illustrated in FIG. 6) so as to direct the magnetic flux from the south-pole segments to the adjacent north-pole segments angularly about the curvature of the array. As with the previously described embodiments of the invention, the tapered shape of the north-pole and south-pole segments 72, 70 as they extend away from the gap 61 maximizes the effective transfer of magnetic flux within the magnetic material of the array to thus provide a greater coupling torque for a given size or volume of array. It will also be obvious that the operation of the FIGS. 4–6 magnetic coupling will be identical to the operation of the FIGS. 1–3 couplings.

From the foregoing description it will be appreciated that the magnetic couples of the present invention, by using Halbach type of magnet arrays to effect the magnetic coupling across a gap, will achieve a more effective transfer of magnetic flux about the arrays and a greater magnetic field strength and coupling torque for a given radial dimension and volume of the arrays.

Although the best modes contemplated for carrying out the present invention have been herein shown and described, it will be apparent that modification and variation may be made without departing from what is regarded to be the subject matter of the invention.

What is claimed is:

1. A magnetic coupling comprising
   a first annular permanent magnet array comprised of a plurality of separately magnetized permanent magnet segments in magnetic flux transmitting contact with each other angularly positioned about the array,
   a second annular permanent magnet array comprised of a plurality of separately magnetized permanent magnet segments in magnetic flux transmitting contact with each other angularly positioned about the array, said second array being closely spaced from and positioned relative to the first array so as to form a uniform annular gap therebetween,
   said permanent magnet segments of each array including at least one south-pole segment magnetized in a direction extending transversely of said gap so as to create a magnetic south pole at a face of the south-pole segment at the gap and including at least one north-pole segment magnetized in a direction extending transversely of said gap so as to create a magnetic north pole at a face of the north-pole segment at the gap, said south-pole and north-pole segments being alternately positioned about each array in angularly spaced positions,
   said permanent magnet segments of each array further including separately magnetized permanent magnet spacer segments magnetized so as to transmit magnetic flux between the angularly spaced south-pole and north-pole segments of each array, said spacer segments filling the annular space between said north-pole and south-pole segments in each of the arrays,
   means for mounting for rotation one of said first and second arrays so that when said one of said arrays is rotated the other array is caused to rotate in synchronism therewith due to the magnetic flux coupling between each pair of generally opposed north-pole and south-pole segments across the gap,
   and with each permanent magnet array having an inner annular surface at the gap and an outer annular surface spaced from the gap with the inner annular surface including the north-pole and south-pole faces, each north-pole and south-pole segment being tapered toward said outer annular surface of its array so as to have a relatively large surface area at the gap and a relatively small surface area at the outer annular surface of its array.

2. A magnetic coupling as set forth in claim 1 wherein said outer annular surface of each north-pole and south-pole segment is in the form of a knife-edge.

3. A magnetic coupling as set forth in claim 1 wherein said permanent magnet spacer segments of each array are uniform in shape with a single spacer segment being positioned between each adjacent pair of north-pole and south-pole segments, each of said spacer segments being magnetized in a direction transversely of the directions of magnification of the adjacent north-pole and south-pole segments.

4. A magnetic coupling as set forth in claim 1 wherein said permanent magnet spacer segments of at least one of said arrays are comprised of first spacer segments having an inner annular surface coextensive with the inner annular surface of the array between each adjacent pair of north-pole and south-pole segments and an outer annular surface shorter than the outer annular surface of the array between each adjacent pair of north-pole and south-pole segments and spaced from such north-pole and south-pole segments, said permanent magnet spacer segments of said one array being further comprised of second spacer segments filling the spaces between each first spacer segment and the adjacent north-pole and south-pole segments, and each of said first and second spacer segments being magnetized generally transversely of its radially extending direction in the array so as to provide a multi-angled path for the magnetic flux through the array between each adjacent pair of north-pole and south-pole segments.

5. A magnetic coupling as set forth in claim 1 wherein said first and second permanent magnet arrays are arranged in a concentric relationship about a common axis of rotation.

6. A magnetic coupling as set forth in claim 1 wherein said first and second permanent magnet arrays have a common axis of rotation and wherein said gap extends in an axial direction between a pair of opposed north-pole and south-pole segments across the gap, said axial direction being parallel to said axis of rotation.

7. For use in a magnetic coupling, an annular permanent magnet array of angularly spaced permanent magnet segments of different magnetic polarities for generating a magnetic field across a gap directly adjacent to the array, said array having an inner annular surface at the gap and an outer annular surface spaced therefrom, said array comprising at least one south-pole permanent magnet segment magnetized in a direction generally along a line passing transversely through the gap and bisecting said segment so as to create a magnetic south pole at the inner annular surface of the array, at least one north-pole permanent magnet segment angularly spaced from said south-pole segment and magnetized in a direction generally along a line passing transversely through the gap and bisecting said segment so as to create a magnetic north pole at the inner annular surface of the array, each of said north-pole and south-pole segments being tapered toward and extending to said outer annular surface of the array so as to have a relatively large surface area at the inner annular surface and a relatively small surface area at the outer annular surface, and a plurality of permanent magnet spacer segments with one or more of said permanent magnet spacer segments being positioned between each adjacent pair of north-pole and south-pole segments to completely fill the annular space between the inner and outer annular surfaces of the array, each of said spacer segments being magnetized in a direction transversely of a radial line of the annular array bisecting the segment in order to maximize the magnetic field strength within a given radial dimension and volume of the array.

8. For use in a magnetic coupling, an annular permanent magnet array as set forth in claim 7 wherein said outer annular surface area of each north-pole segment and each south-pole segment is in the form of a knife-edge.

9. For use in a magnetic coupling, an annular permanent magnet array as set forth in claim 7 wherein the array has an axis of rotation and wherein said inner and outer annular surfaces of the array are located in a concentric relationship with respect to said axis of rotation.

10. For use in a magnetic coupling, an annular permanent magnet array as set forth in claim 7 wherein the array has an axis of rotation and wherein the inner and outer surfaces of the array are spaced in a direction that is parallel to said axis of rotation.

11. A magnetic drive for transferring torque between physically separated rotatable members, said drive comprising a first annular permanent magnet array comprised of a plurality of separately magnetized permanent magnet segments in magnetic flux transmitting contact with each other angularly positioned about the array, a second annular permanent magnet array comprised of a plurality of separately magnetized permanent magnet segments in magnetic flux transmitting contact with each other angularly positioned about the array, said second array being closely spaced from and positioned relative to the first array so as to form a uniform annular gap therebetween, said permanent magnet segments of each array including at least one south-pole segment magnetized in a direction extending transversely of said gap so as to create a magnetic south pole at a face of the south-pole segment at the gap and including at least one north-pole segment magnetized in a direction extending transversely of said gap so as to create a magnetic north pole at a face of the north-pole segment at the gap, said south-pole and north-pole segments being alternately positioned about each array in angularly spaced positions, said permanent magnet segments of each array further including separately magnetized permanent magnet spacer segments magnetized so as to transmit magnetic flux between the angularly spaced south-pole and north-pole segments of each array, said spacer segments filling the annular space between said north-pole and south-pole segments in each of the arrays, and means for driving one of said arrays so that the other array is caused to rotate in synchronism therewith due to the magnetic flux coupling each pair of generally opposed north-pole and south-pole segments across the gap, each permanent magnet array having an inner annular surface at the gap and an outer annular surface spaced from the gap with the inner annular surface including the north-pole and south-pole faces, each north-pole and south-pole segment being tapered toward said outer annular surface of its array so as to have a relatively large surface area at the gap and a relatively small surface area at the outer annular surface of its array.

12. A magnetic drive as set forth in claim 11 wherein said permanent magnet spacer segments of each array are uniform in shape with a single spacer segment being positioned between each adjacent pair of north-pole and south-pole segments, each of said permanent magnet spacer segments being magnetized in a direction transversely of the directions of magnification of the adjacent north-pole and south-pole segments.

13. A magnetic drive as set forth in claim 11 wherein said permanent magnet spacer segments of at least one of said arrays are comprised of first spacer segments having an inner annular surface coextensive with the inner annular surface of the array between each adjacent pair of north-pole and south-pole segments and an outer annular surface shorter than the outer annular surface of the array between each adjacent pair of north-pole and south-pole segments and spaced from such north-pole and south-pole segments, said permanent magnet spacer segments of said one array being further comprised of second spacer segments filling the spaces between each first spacer segment and the adjacent north-pole and south-pole segments, and each of said first and second spacer segments being magnetized generally transversely of its radially extending direction in the array so as to provide a multi-angled path for the magnetic flux through the array between each adjacent pair of north-pole and south-pole segments.

14. A magnetic drive as set forth in claim 11 wherein said first and second permanent magnet arrays are arranged in a concentric relationship about a common axis of rotation.

* * * * *